United States Patent

Bickford et al.

[15] 3,706,887

[45] Dec. 19, 1972

[54] OPTICAL CARD READER

[72] Inventors: Jerome R. Bickford; James O. Nicholson, both of Rochester, Minn.

[73] Assignee: International Business Machines Corporation, Armonk, N.Y.

[22] Filed: March 4, 1971

[21] Appl. No.: 120,949

[52] U.S. Cl.........250/219 DC, 250/209, 235/61.11 E

[51] Int. Cl. ..............................................G08c 9/06

[58] Field of Search........250/219 D, 219 DC, 214 R, 209, 250/208; 235/61.11 E

[56] References Cited

UNITED STATES PATENTS

| | | | |
|---|---|---|---|
| 3,560,751 | 2/1971 | Buettner et al. | 250/214 |
| 3,524,047 | 8/1970 | Gorder et al. | 250/219 DC X |
| 3,173,000 | 3/1965 | Johnson et al. | 250/219 DC X |
| 3,518,440 | 6/1970 | Hanson et al. | 250/219 D |

*Primary Examiner*—Walter Stolwein

*Attorney*—Hanifin & Jancin and Robert W. Lahtinen

[57] ABSTRACT

The optical reader of the invention uses a discrete number of pulses to time the passage of each column position, samples hole data at four selected count positions and interrogates the samples to ascertain whether the condition of the samples indicates the presence or absence of data or an error condition. When valid data is sensed by data indications adjacent one end of the sample sequence, the interpreting circuit also indicates whether the presence of the hole occurred early or late with respect to nominal timing. In addition mark read data may be read at the same read station using selected samples that are interpreted as presence or absence of data or an error condition using the same interpreting circuitry.

9 Claims, 6 Drawing Figures

INVENTORS.
JEROME R. BICKFORD
JAMES O. NICHOLSON
BY Robert W. Lahtinen
ATTORNEY

OPTICAL CARD READER

BACKGROUND OF THE INVENTION

This invention pertains to document readers and more particularly to optical punched hole media readers.

Any sensing scheme for reading data from punched cards has the basic function of identifying the existence of a punched hole and assigning the hole sensed to a specific location on the card.

The hole sensing technique of the present invention, in the embodiment shown and described, utilizes a four strobe optical sensing technique that not only provides the basic functions, but in addition affords diagnostic capability to determine when the system is operating marginally and aid in identifying problems when error conditions occur.

Use of a four strobe sensing mode provides data, error and hole timing information. A single collimated light source with high resolution is directed toward a single light sensing aperture to activate a photo transistor. The four strobes occur in sequence to sample each column data position four times and each sample is placed in a storage register.

The four strobes are consecutively stored in a register having correspondingly consecutive positions A, B, C and D and thereafter are decoded to ascertain the presence or absence of data. If all register positions contain a zero condition indicative of a lack of data or all contain a one condition indicating the presence of data, the output is clearly apparent. The intermediate signals stored in the registers as a result of the four strobes are further interpreted whereby if one conditions are found in registers A and B or C and D the resolution is that valid data occurred at the data position. If a one condition is found in any register at a data position where the interpretation of the contents of the registers indicates no data is present, an error condition is indicated. Although register contents wherein the strobe samples A through D are respectively 1101 or 1011 indicating the absence of data found by an intermediate strobe, would appear to be invalid and representative of an error condition, it has been found that such condition does represent valid data and is indicative of other factors such as a torn web between adjacent holes.

In addition to identifying the presence or absence of data at a column location, it is vital that the reader is assured that no data has been missed. Accordingly, the last strobe of one data position and the first strobe of the next subsequent data position must occur in sufficient proximity to one another to assure that a worst case of off punched data centered between the data positions may cause at least an error condition to occur in one of the data position outputs. In the illustrated embodiment, a series of 16 pulses are generated during the transit of each data position. The count is decoded and the data sensing strobes occur on the occurrence of pulses 5, 6, 9 and 10 and each data position. The space between pulse 10 in one position and pulse 5 in the next subsequent position is of less duration than the duration of transit of a hole from the initiating threshold to the terminating threshold of the data pulse.

The use of the multiple strobe technique also provides diagnostic information. If the interpretation of the conditions found by the four strobes discloses the presence of data with a zero condition in the D register, late timing is indicated on a signal light to show that the hole arrived late at the data position. Similarly, a valid data output with a zero condition in the A register location causes the early timing light to be activated as an indication that the hole arrived early at the data position. This information can be used for timing the reader or can reveal an off punch condition with respect to the card being processed. Adjustment can be achieved by adjusting the initiating mechanism, which in the disclosed embodiment is an optical trailing edge indicator, between an early and late timing condition while using a card or cards having known accuracy of the punched hole locations.

Another advantage of the device of the present invention is the ability to utilize mark reading at the same read station. In addition, the same decoding and interpreting hardware is utilized to determine the presence or absence of data or an error condition. The dual outputs of a mark read read system such as that shown in U.S. Pat. No. 3,560,751 assigned to the same assignee are placed respectively into the A and B register locations (the C and D position not being accessed have blanks or zero conditions). The contents of the register positions are then interpreted using the same hardware which indicates the presence or absence of data upon finding respectively ones or zeros in both A and B register locations and an error condition when like conditions are not found in the A and B locations.

It is an object of this invention to provide a reliable punched hole reader with enhanced ability to identify the presence or absence of data or an error condition. It is a further object of this invention to provide a reader for reading documents having data thereon in the form of punched holes which simultaneously supplies diagnostic data as to marginal operating conditions of the system. It is also an object of this invention to provide a document reader with the capability of reading both punched holes and optical marks using the same read station and largely the same means for decoding and analyzing data. The foregoing and other objects, features and advantages of the invention will be apparent from the more particular description of a preferred embodiment of the invention, as illustrated in the accompanying drawings.

DETAILED DESCRIPTION

Figure 1:
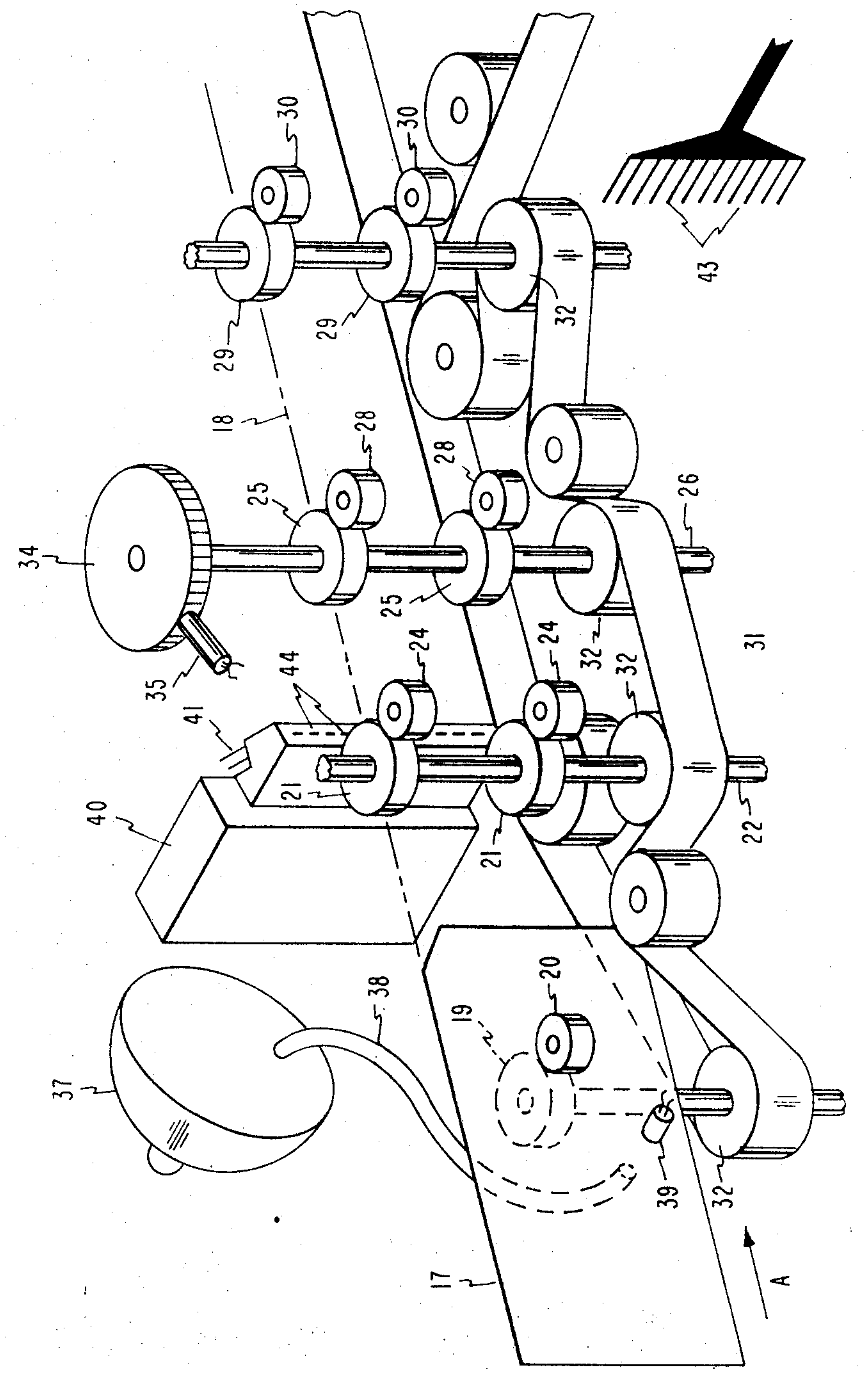
FIG. 1 is a partially exploded schematic view of the read station and transport elements of a reader incorporating the invention.

Referring to FIG. 1 of the drawings the exploded schematic view of the read station includes a card path wherein a card 17 progresses in the direction of arrow A within the confines of the dashed lines 18 and constrained by guiding and aligning means not shown. The card 17 is driven through this portion of the document transport by a series of continuously running drive rolls and cooperating selectively operable pinch or pressure rolls beginning with the drive roll 19 and cooperating pressure roll 20, the latter being selectively operable to initiate transport of the card through the read station. At the read station a pair of first drive rolls 21 mounted for rotation in unison with the common shaft 22 cooperate with selectively operable pressure rolls 24 and a second pair of read station drive rolls 25 rotating in unison with a shaft 26 and cooperate with pressure rolls 28. As the card 17 leaves the read station it comes under the control of drive rolls 29 and selectively actuable cooperating pressure rolls 30, which form part of the machine transport beyond the read station. Drive rolls 19, 21, 25 and 29 are all driven at the same speed by a belt 31 operating through pulleys 32 to effect a uniform card transport velocity past the read station. Selectively operable pressure rolls 24 and 28 associated with the first and second read station drive rolls are operated simultaneously. Also carried by the second read roll shaft 26 and rotating in unison therewith is a toothed emitter wheel 34 and adjacent to emitter wheel 34 is an emitter pickup 35. The emitter wheel 34 generates sixteen pulses for each column pitch as the card is transported past the read station. Illumination for the optical read station is supplied by a lamp 37 which also provides illumination to one end of a fiber optic light conduit 38, the opposite end of which confronts the card path upstream of the read station. A photo transistor 39 confronts the terminal end of the fiber optic conduit at the opposite side of the card path. The photo transistor 39 and the cooperating terminal end of the fiber optic conduit 38 are located along the card path in such manner that the photo transistor is uncovered and issues a signal as the card has entered the read station and is approximately a distance of one half column pitch from the nominal centerline of the first column position on the card. Accordingly, utilizing the output of photo transistor 39 to initiate a counter which counts the output of the clock pulses from emitter wheel pick up 35, each sixteen pulses define the transit of one card column past the read head.

The optical mark read (OMR) portion of the reader includes lamp 37 and a collimator assembly 40, which delivers highly collimated light to 12 discrete rectangular apertures along the card path. In practice these apertures are approximately 0.01 inches wide in the direction of card travel and are closely proximate to the card path, being separated therefrom only by a glass plate to cause the surface to be self cleaning. Leading from the OMR read head structure is a series of leads 41 extending from the respective photo transistor that picks up reflected light from a respective one of the data sensing locations which are twelve in number and respectively confront the 12 row positions at which data is disposed upon the card. This optical mark read structure is shown in greater detail in U.S. Pat. No. 3,560,751, assigned to the same assignee and will not be further described herein. Confronting the opposite side of the card path of the read station are a series of 12 photo transistors 43 respectively confronting the light transmitting apertures 44 of the collimator assembly at the 12 respective row positions to transmit an output when light is received through a punched hole in the confronting card.

Figures 2, 2B:
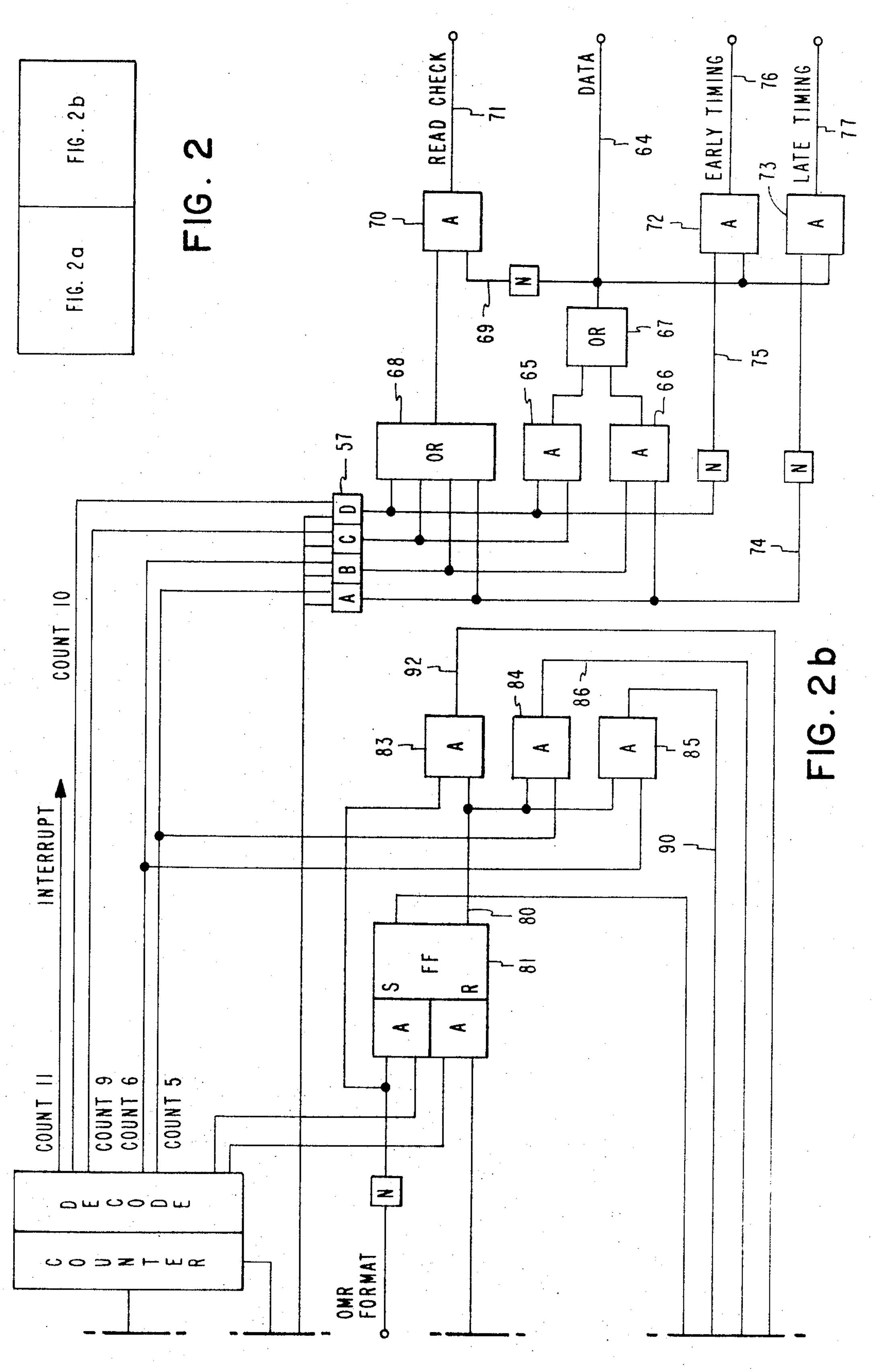
FIGS. 2, 2*a* and 2*b* are a logic diagram showing the sensing, counter, decode and interpretative circuitry of the combined hole and optical mark reader of the invention.
Figure 2A:
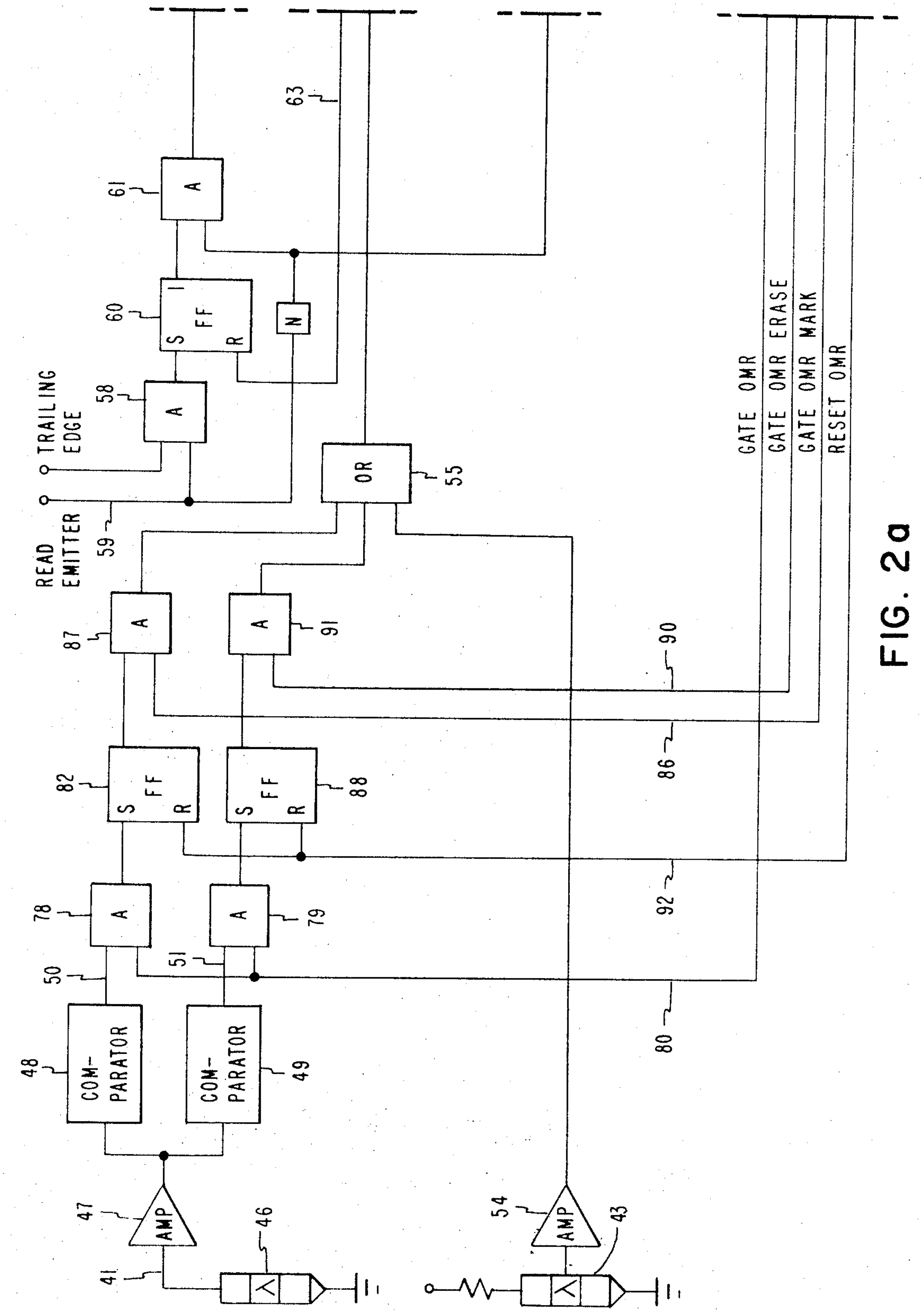

FIGS. 2*a* and 2*b* illustrate the reading scheme as it applies to the OMR and hole reading for one of the 12 positions of the read head. The optical mark reader uses a photo transistor 46 to sense a reflected light level from the card surface which is transmitted through an amplifier 47 to a pair of comparator circuits 48 and 49. This optical mark read system utilizes the comparator 48 to determine when an eighty percent reduction in light level has occured on the card surface whereupon a signal is issued on line 50 which is hereafter identified OMR mark. The comparator 49 is similar to the OMR mark comparator but distinguishes a light reduction of approximately sixty percent at which time it issues an output along line 51 which is hereafter referred to as OMR erase. In this optical mark reading scheme, any light reduction which fails to cause an output of the comparator 49, which is indicated as an erase, is ignored by the reader and any mark which causes an output by both comparator 49 and comparator 48 is indicative of valid mark data. Any mark or other signal which causes an erase output from comparator 49 but is not sufficient to cause a mark output from comparator 48 is identified as an error condition.

When in the hole reading mode, the photo transistor 43 connected to the amplifier 54 delivers an output to the OR block 55 when a hole is present, permitting light from the collimator output to impinge upon the photo transistor 43. When a card interrupts the transmission of light from the collimator assembly 40 to the photo transistor 43 amplifier 54 fails to deliver a signal to the OR block 55. Accordingly, in binary terms it may be considered that the amplifier 54 has a one output when an hole is present confronting photo transistor 43 and a zero condition when the light transmission to photo transistor 43 is interrupted by a card at the read location.

The reader here being described is normally in the hole reading mode of operation and transfers to the optical mark read mode upon receipt or a format indication. The requirement for optical mark reading is that optical mark columns must be separated from one another and from a hole reading field by one blank column.

While in the normal hole reading mode, the amplifier 54 connects through OR block 55 to the register 57. The count for reading a particular card 17 at the read station begins when the trailing edge photo transistor 39 delivers an output to AND block 58 in combination with the next succeeding pulse from the read emitter pickup 35 on line 59 to set latch 60, whereupon the output thereof is ANDed at 61 with the next inverted down signal of the read emitter to initiate counter operation. The counter 62 thereupon successively counts sixteen pulses for each column position identifying the transit of each column position and also counts the consecutive column positions to determine which of the eighty column positions is currently present at the read station. At a column count in excess of eighty, indicating that all card columns have passed the read head, an output is issued on line 63 to reset the latch 60 preparatory to the arrival of the next subsequent card.

Figure 4:
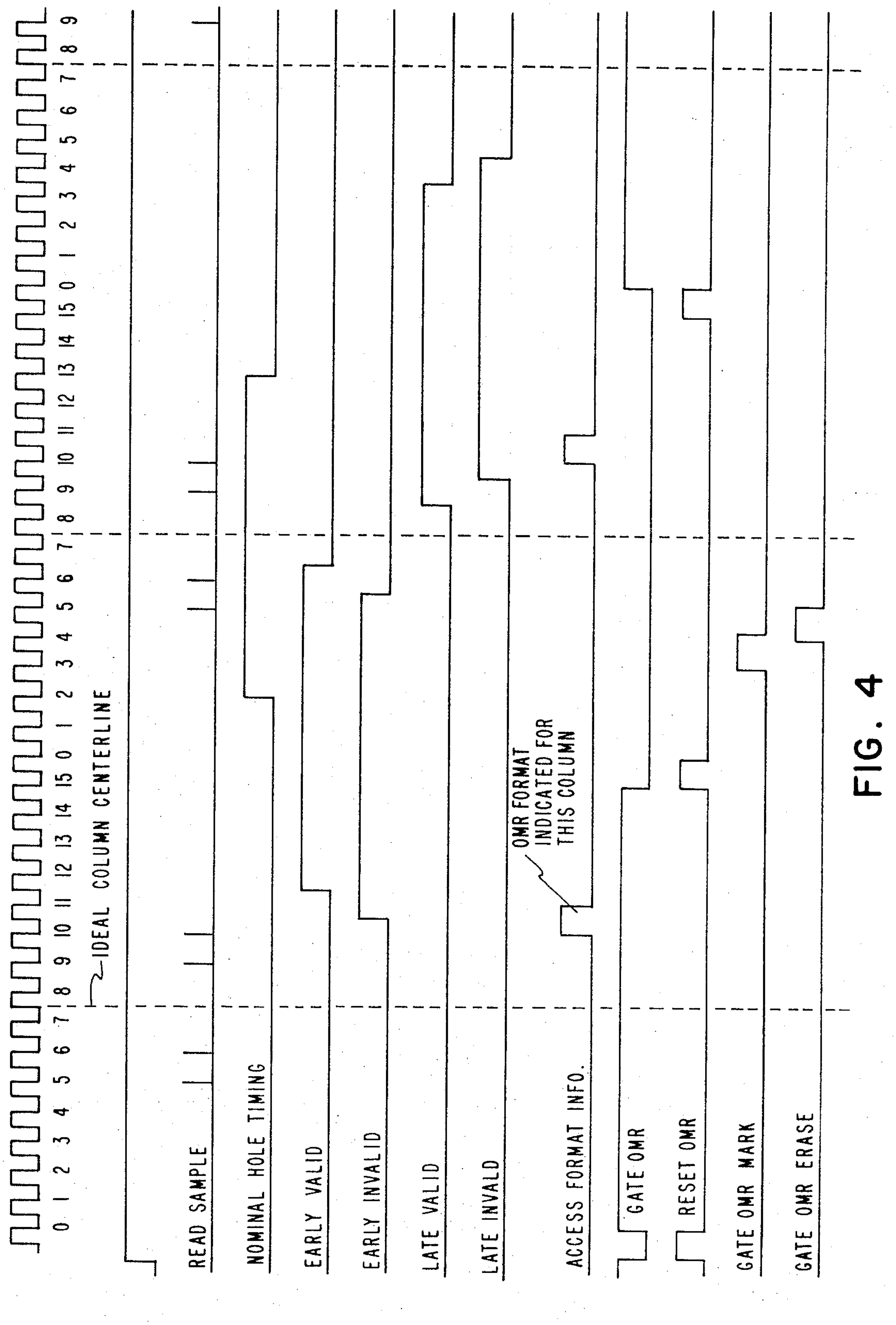
FIG. 4 includes a series of timing diagrams and examples of hole timing at column locations.

As shown also in the timing diagram of FIG. 4, during the transit of each column position past the read head the sixteen counts are shown in binary form numbered from zero to 15 and reset to zero. Each column location is strobed four times to determine the output condition of the line from the hole reading amplifier 54. This is accomplished using a polarity hold to determine the condition of the output of the amplifier on the occasion of the fall of current of selected pulses and causing the conditions of the selected samples of the output to be placed in preselected locations A, B, C, or D in the register 57. As described herein, the decode strobes sample the hole reading output on the occurrence of pulses 5, 6, 9 and 10 and respectively enter the zero or one conditions sensed in positions A, B, C and D of register 57. As seen at FIG. 4, the read sample strobes are symmetrically arranged about the ideal column centerline and accordingly the centerline of a correctly punched nominal hole. When the four samples have been placed in the register, a subsequent count, herein count 11, initiates an interrupt which causes the contents of register to be delivered to a data storage location through an interpreting circuit which distinguishes the presence or absence of data or an error condition and also provides diagnostic information. The output of register 57 is delivered to a pair of AND blocks 65 and 66 with samples A and B being ANDED at block 66 and samples C and D ANDED at block 65. The outputs of AND blocks 65 and 66 are received by OR block 67, an output from which on line 64 is an indication of the presence of valid data. Accordingly it will be seen that if either the samples A and B or C and D indicate the presence of data the reader interprets a hole to be present assigned to that column. Each of the samples in positions A, B, C and D of register 57 is also directed to OR block 68 with the output thereof ANDED with the inverted output 69 of the data signal from the OR block 67 to yield at the output 71 of AND block 70 a signal indicative of a read check. Accordingly, an error condition is indicated whenever one of the samples A, B, C or D has a one condition indicative of the presence of data simultaneously with a zero condition at the data output 64 of OR block 67 indicating that valid data is not present. The data output 64 of OR block 67 is also supplied to AND block 72 and AND block 73. The inverted output 74 of sample A and the inverted output of channel D are respectively the second inputs of AND block 73 and AND block 72. Accordingly, if a one condition appears in samples A, B and C or A and B while a zero condition occurs in sample D, the output 76 of AND 72 will be directed to a signal (such as an indicator light which is not shown) to indicate early timing. In like manner, should sample C and D or B, C and D have a one condition while sample A has a zero condition, the output 77 of AND 73 will actuate a signal (not shown) indicative of late timing. As shown in the various timing diagrams of FIG. 4, an early hole that indicates data upon the occurrence of strobes at pulses 5 and 6 which provide samples A and B but does not indicate data upon the occurrence of strobes at pulses 9 and 10 which provide samples C and D will be recognized as a valid data output but the reading of such a hole will also actuate the early timing signal at the output 76 of AND block 72 indicating a marginal operating condition from such a source as machine timing or an off punched card. If the hole appears so early that only the sample A generated by the strobe on count 5 is indicative of the presence of data and invalid data or error condition will occur at the output 71 of AND block 70. Likewise where late timing occurs and one conditions are found only at the time samples C and D, occasioned by the strobes at counts 9 and 10, valid data will be indicated assigned to that column and a late timing output on line 77 will occur while a hole present only during the strobe at count 10 to impart a one condition to sample D will indicate an error condition at the output 71 of AND block 70. Also, the signal generated by a hole is of sufficient duration that an off punched hole cannot be centered precisely between the centerlines of the nominal columns in such manner as to not have a one condition generated by the strobe of the tenth count of one column or the strobe at the fifth column of the next succeeding column position. Thus data cannot be lost between adjoining columns.

The diagnostics provided by the early and late timing indications may serve to identify improperly punched cards, may be used to adjust the machine timing, and may be useful in identifying other machine problems. If the basic machine timing should not be accurate, the position of the trailing edge sensor along the card path may be varied and finally adjusted to a location midway between the setting which initially generates an early timing signal and the setting that initially generates a late timing signal. It has further been found that when a card strikes an obstruction while in the read station, it is likely all succeeding columns will have mistimed data. It is then possible to insert a card in the read station to the column position at which the first mistimed data appeared and thereupon by examining the position of the leading edge of the card to determine what the obstruction was or the position in which the obstruction was disposed when the collision occurred.

When it is desired to read in optical mark read (OMR) format, format information for that column is accessed at the 11th count. If the format information indicated the current column is to be read in optical mark mode, sample decode is suppressed and the storage address is not updated. The OMR format is activated to condition transmission of OMR data during the next column time. By not setting latch 81 at count 1 following reset at count 0, output 80 is deactivated during the next column cycle. With the output 80 of the reset position of latch 81 delivered to AND blocks 83, 84 and 85, the next pulse 5 delivers a signal to AND block 84 causing the output 86 thereof to be delivered to the input of AND block 87 which gates the signal from the mark output 50 of comparator 48, if one is present, through OR block 55 to register 57 to impart the one or zero condition found at the output of the mark comparator to the sample A position of register 57. Similarily the output of the next count (count 6), is delivered to AND block 85 causing an output therefrom to be received at the input of AND 91 which permits the output 51 condition of comparator 49 to be delivered through OR 55 to register 57 to impart the condition of the output of comparator 49 to the sample position B in register 57. Since no access is had to the sample position C and D in the register, these positions will contain a logical zero. The decode is now activated and the presence or absence of data and read check information is placed in storage. The storage address is updated and zero conditions are placed in the next column position.

When the OMR data in the sample positions A and B of register 57 is decoded through the interpreter circuitry, the presence or absence of data or an error condition will be indicated in the same manner as hole data. If both A and B contain a one condition, the coincidence thereof from the output of AND 66 will be indicative of data while a logical zero condition in both samples A and B will indicate an absence of data. If either A or B indicate the presence of data while the other indicates the absence thereof, the input through OR block 68 to AND 70 which is combined with the output 69 from OR 67 will indicate an error condition or read check at 71.

Figure 3:
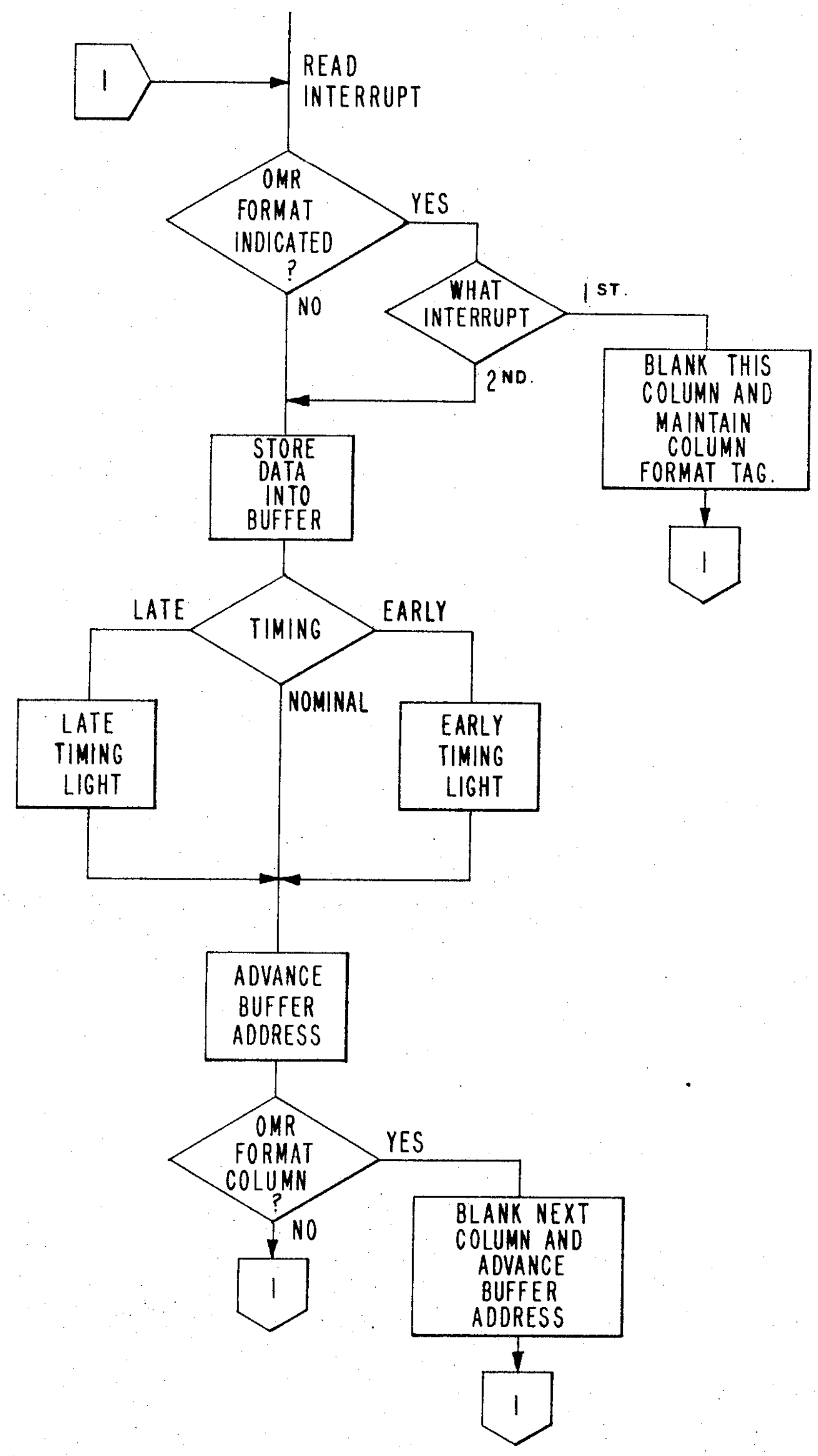
FIG. 3 is a flow chart illustrating the sequencing of a portion of the circuit functions.

Referring to FIG. 3 a portion of the operation of the reader is shown using a flow chart. The read interrupt which occurs at column count 11 first determines whether the column format information indicates optical mark reading (OMR), if not any data present is thereupon stored in the buffer. If the column format information indicates OMR read mode, a further determination is made as to whether this is the first interrupt, in which instance the column is blanked, the column format tag maintained and the operating sequence returned to the initial read interrupt or the second interrupt whereupon the data is stored in the buffer. In the hole read mode the timing information is significant. In the OMR mode only the A and B samples are utilized and accordingly the timing information is not significant. Finally, the advance of the data storage buffer address is accomplished in accordance with the column reading mode.

While the invention has been particularly shown and described with reference to a preferred embodiment, it will be understood by those skilled in the art that various changes in form and details may be made therein without departing from the spirit and scope of the invention. For example, the number times that the data is sampled at each column or data location might be varied by increasing or decreasing such number of sample strobes. Likewise the selection of the specific column counts at which the data is strobed may be varied to meet the needs of a particular application or to alter the meaning of the associated diagnostic information to accord with specific requirements.

What is claimed is:

1. A reader for reading documents having data recorded thereon in columns by passing said document past a read station comprising:
  a read station;
  column timing means for determining the presence and duration of passage of each said column at said read station;
  means for sensing document position for initiating said column timing means;
  data sensing means for generating a sequence, exceeding two in number, of intermediate data sensing output signals at each data location, said signals having a first condition when the presence of data is sensed and a second condition when the absence of data is sensed; and
  interpreting means for receiving said intermediate output signals and generating a first output signal indicative of data upon a first coincidence of intermediate output signal conditions, a second output signal indicating the absence of data upon a second coincidence of intermediate output signal conditions, and a third output signal indicative of an error condition upon receiving a third coincidence of intermediate output signal conditions, each combination of intermediate output signal first and second conditions causing said interpreting means to generate one of said first, second and third output signals.

2. The reader of claim 1 wherein said interpreting means generates said first output when consecutive intermediate output pulses less than a total of said sequence and adjoining one end of said sequence have said first condition and further comprising diagnostic means for determining such condition and indicating at which of the ends of said sequence said first condition intermediate output pulses occurred.

3. A reader for reading documents having data recorded thereon in the form of punched holes arranged in columns comprising
  a read station;
  column timing means for determining the presence and duration of passage of each said column at said read station;
  means for sensing an initial document position and initiating said column timing means;
  hole sensing means for generating a sequence of intermediate signals in excess of two during the transit of each document hole position past said read station, said signals indicating a first condition when sensing the presence of a hole and a second condition when sensing the absence of a hole; and
  interpreting means for examining said intermediate signals and generating a first output indicating the presence of a hole at a corresponding column position, a second output indicating the absence of a hole at said corresponding column position, and a third output indicative of an error condition at said corresponding column position in accordance with predetermined combinations of the incidence of said first and second conditions.

4. The reader of claim 3 wherein a plurality of consecutive intermediate signals adjacent one end of said sequence having said first condition is indicative of data and further comprising diagnostic means generating a fourth output signal when one of the terminal intermediate signals indicates said second condition and said interpreting means generates said first output.

5. The reader of claim 3 wherein said sensing means generates a sequence of four intermediate output signals at each column position timed to sense four locations symmetrically positioned about the nominal center line of a hole punched in such column position and said interpreting means generates said first output when a predetermined coincidence of intermediate signals occurs wherein less than all indicate said first condition.

6. The reader of claim 5 further comprising diagnostic means generating a fourth diagnostic output said first output occurs when said first intermediate signal indicates a second condition and a fifth diagnostic output when said fourth intermediate signal indicates said second condition upon occurrence of said first output, whereby a determination may be made as to the deviation of the punched hole from a nominal position while still indicating the presence of data.

7. A reader in accordance with claim 3 which has the additional capability of reading optical marks using the same read station that further comprises format means for determining which of hole data and mark data may occur at each data position;

first and second optical mark read means for respectively generating first and second mark outputs each having a first condition when the presence of a mark is sensed and a second condition when the absence of the mark is sensed; and means for imparting the first or second condition respectively to two consecutive of said intermediate signals which are at one terminal end of said sequence, whereby said interpreting means identifies the presence of mark and hole data in accordance with the determination provided by the said interpreting means.

8. A reader in accordance with claim 5 which has the additional capability of reading optical marks using the same read station that further comprises format arranging means for determining which of hole data and mark data may occur at each data position;

first and second optical mark read means for respectively generating first and second mark outputs each having a first condition when the presence of a mark is sensed and a second condition when the absence of the mark is sensed; and means for imparting the first or second condition respectively to two consecutive of said intermediate signals which are at one terminal end of said sequence, whereby said interpreting means identifies the presence of mark and hole data in accordance with the determination provided by the said interpreting means.

9. A reader in accordance with claim 8 wherein in the mark read mode the first and second mark outputs impart the one of said first and second conditions respectively to said first and second intermediate signals and said third and fourth intermediate signals have said second condition when said reader is operating in said optical mark read mode.

* * * * *